No. 793,559.

Patented June 27, 1905.

UNITED STATES PATENT OFFICE.

MAX BAZLEN AND THEODOR WOHLFAHRT, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

FORMALDEHYDE SULFOXYLATE AND PROCESS OF MAKING SAME.

SPECIFICATION forming part of Letters Patent No. 793,559, dated June 27, 1905.

Application filed April 22, 1905. Serial No. 256,984.

*To all whom it may concern:*

Be it known that we, MAX BAZLEN, a subject of the King of Würtemberg, and THEODOR WOHLFAHRT, a subject of the King of Bavaria, doctors of philosophy and chemists, residing at Ludwigshafen-on-the-Rhine, in the Kingdom of Bavaria, German Empire, have invented new and useful Improvements in Formaldehyde Sulfoxylate and Processes of Making the Same, of which the following is a specification.

Our invention relates to the production of discharging agents.

In the specification of the application for Letters Patent, Serial No. 253,877, filed April 4, 1905, is described the production of salts of formaldehyde sulfoxylic acid, and in particular of the sodium salt by fractional crystallization, or precipitation, or extraction of the formaldehyde hydrosulfite compound, or by reduction of this formaldehyde hydrosulfite compound, or by reduction of the formaldehyde bisulfite compound.

We have now discovered that by allowing one molecular proportion of a hydrosulfite and one molecular proportion of formaldehyde to react on one another in the presence of caustic alkali or of an alkaline earth salts of formaldehyde sulfoxylic acid can be obtained easily and in good yield, and at the same time a normal sulfite is formed which does not combine with formaldehyde and can easily be removed from the aforesaid compound by any suitable method—such, for instance, as by evaporating the solution till the sulfite salt crystallizes out or by precipitation by the addition of alcohol. Instead of formaldehyde other equivalent aldehyde—such, for instance, as acetaldehyde or benzaldehyde may be employed and corresponding compounds be obtained. The salts of formaldehyde sulfoxylic acid thus obtained are claimed generically in the claim of the aforesaid specification, and we make no general claim thereto; but what we regard as our invention and wish to claim specifically are the new process for the manufacture of these bodies and the new specific sulfoxylate—namely, the monocalcium salt of formaldehyde sulfoxylic acid, such as can be prepared according to the following Example 1. This salt is easily soluble in water and reduces indigo carmine upon heating, which capacity is not increased by treatment with zinc-dust and acetic acid, it is difficultly soluble in absolute methyl alcohol and contains no formaldehyde bisulfite compound, and upon addition of a solution of sodium carbonate to its aqueous solution yields a white precipitate. Upon titration in neutral solution with iodin our compound requires more than three atomic proportions of iodin to each atomic proportion of sulfur present. When heated, it does not melt.

The following examples will serve to further illustrate our new process and also the manner in which our new product can be made. The parts are by weight.

Example 1: Stir well together a paste of one hundred and sixty-eight (168) parts of calcium hydrosulfite in from one thousand (1,000) to thirteen hundred (1,300) parts of water with thirty-seven (37) parts of calcium hydrate and one hundred (100) parts of a thirty (30) per cent. formaldehyde solution and warm the whole to a temperature of about forty degrees centigrade, (40° C.) After maintaining this temperature for a few hours the mixture loses its power of reducing indigo-carmine solution in the cold. Then filter and evaporate the filtrate in a vacuum, whereupon at first a small quantity of the difficultly-soluble dicalcium salt separates out. Filter this off and evaporate the filtrate further in a vacuum. The monocalcium formaldehyde sulfoxylate separates out in the form of fine needles and can be filtered off and dried.

Example 2: Mix together a concentrated neutral or alkaline solution of one (1) molecular proportion of sodium hydrosulfite ($Na_2S_2O_4$) and one (1) molecular proportion each of caustic soda and of formaldehyde, each in the form of a thirty-five (35) per cent. solution. The mixture becomes warm. Evaporate the solution obtained and allow the sodium sulfite formed to crystallize out or precipitate it by means of the addition of an equal volume of alcohol. Then filter it off. Evaporate the filtrate, preferably under reduced pressure, until it is of a syrupy consistency, and this, either after standing for some time, or more quickly if a previously-obtained crystal be added, solidifies, yielding an almost colorless mass of the sodium salt of formaldehyde sulfoxylic acid.

Example 3: Follow the directions given in Example 2, with the exception that a chemically equivalent quantity of acetaldehyde dissolved in its own volume of water is substituted for the formaldehyde. In this way the sodium salt of acetaldehyde sulfoxylic acid is obtained. This, however, is more difficultly crystallizable than is the corresponding formaldehyde compound.

Example 4: Dissolve nineteen (19) parts of sodium hydrosulfite (containing about ninety (90) per cent. of $Na_2S_2O_4$) in one hundred (100) parts of water, add ten (10) parts of caustic-soda solution, containing about thirty-five (35) per cent. of NaOH, and warm to a temperature of about forty degrees centigrade, (40° C.) Then add eleven (11) parts of benzaldehyde and continuously shake the mixture. Reaction takes place with evolution of heat, and after a short time the new compound separates out in the form of long prisms. When the separation is complete, filter this new compound off, wash it with alcohol, and dry it in a vacuum at a temperature of from forty to sixty degrees centigrade, (40° to 60° C.) The product so obtained combines with caustic-soda solution, yielding a crystallizable salt which is very easily soluble in water and which yields a difficultly-soluble precipitate with calcium hydrate and barium hydrate. If in this example instead of one molecular proportion of caustic-soda solution a moderate excess be added and the reaction be allowed to take place at ordinary temperature, a different compound is obtained, which crystallizes in the form of hexagonal plates and which reduces indigo carmine in the cold. By dissolving this compound in caustic-soda solution and by precipitating with mineral acid or by prolonged drying in a vacuum it is converted into the above-mentioned compound, which only reduces when hot.

Now what we claim is—

1. The process for the production of formaldehyde sulfoxylates which consists in treating a mixture of equimolecular proportions of a hydrosulfite and of formaldehyde with a caustic alkaline substance.

2. The process for the production of monocalcium formaldehyde sulfoxylate which consists in treating a mixture of equimolecular proportions of calcium hydrosulfite and of formaldehyde with one molecular proportion of milk of lime.

3. As a new article of manufacture monocalcium formaldehyde sulfoxylate which is readily soluble in water and difficultly soluble in absolute methyl alcohol and contains no formaldehyde bisulfite compound, which does not melt upon being heated and which reduces indigo carmine upon heating, which capacity is not increased by treatment with zinc-dust and acetic acid and which compound upon titration in neutral solution with iodin requires more than three atomic proportions of iodin to each atomic proportion of sulfur present and which upon addition of a solution of sodium carbonate to its aqueous solution yields a white precipitate.

In testimony whereof we have hereunto set our hands in the presence of two subscribing witnesses.

MAX BAZLEN.
THEODOR WOHLFAHRT.

Witnesses:
ERNEST F. EHRHARDT,
J. ALEC. LLOYD.